United States Patent [19]

Ushijima et al.

[11] 4,161,895

[45] Jul. 24, 1979

[54] HYDRAULIC CONTROL SYSTEM FOR AUTOMATIC TRANSMISSION

[75] Inventors: Fmihiro Ushijima; Kagenori Fukumura, both of Toyota, Japan

[73] Assignee: Toyota Jidosha Kogyo Kabushiki Kaisha, Aichiken, Japan

[21] Appl. No.: 774,118

[22] Filed: Mar. 3, 1977

[30] Foreign Application Priority Data

Sep. 13, 1976 [JP] Japan .............................. 51-108728

[51] Int. Cl.$^2$ ........................................... B60K 21/00
[52] U.S. Cl. .................................. 74/867; 192/109 F; 74/869
[58] Field of Search .............. 74/867, 868; 192/109 F, 192/87.14, 87.18, 87.19

[56] References Cited

U.S. PATENT DOCUMENTS

| | | | |
|---|---|---|---|
| 3,707,890 | 1/1973 | Ito | 74/868 |
| 3,896,705 | 7/1975 | Patton | 192/109 F X |
| 3,951,011 | 4/1976 | Lemmon | 74/868 X |
| 4,023,444 | 5/1977 | Murakami | 192/109 F X |

Primary Examiner—C. J. Husar
Assistant Examiner—Frank H. McKenzie, Jr.
Attorney, Agent, or Firm—Toren, McGeady and Stanger

[57] ABSTRACT

An hydraulic control system for automatic transmissions includes at least first and second engaging members, a transmission for establishing at least two change gear ratios due to the selective engagement of said first and second engaging members, a first servo-mechanism for controlling the engagement of the first engaging member for shifting to a high speed, and a second servo-mechanism for controlling the engagement of the second engaging member for shifting to a low speed. Shifting to a high speed is established due to engagement of the first engaging member and release of the second engaging member, and shifting to a low speed is established due to release of the first engaging member and engagement of the second engagement member. A shift timing valve controls the communication of the second servo-mechanism with an accumulator for use with the second servo-mechanism, in response to the build-up of a pressure to a given level in the first servo-mechanism.

8 Claims, 13 Drawing Figures

HYDRAULIC CONTROL SYSTEM FOR AUTOMATIC TRANSMISSION

BACKGROUND OF THE INVENTION

Field of the Invention:

The present invention relates generally to hydraulic control systems and more particularly to systems for use in automatic transmissions equipped with hydraulic servo-mechanisms and accumulators therefor.

Clutches and brakes equipped with hydraulic servo-mechanisms, brakes and the like are used in transmissions to establish a given change gear ratio. A hydraulic control circuit is provided which includes a plurality of valves for controlling pressures to be fed to these servo-mechanisms.

However, it has been found that several problems are encountered with prior art hydraulic control circuits. Among the problems encountered are the following:

(1) In circuits equipped with a shift timing valve, even when the shift timing valve has an auxiliary exhaust passage connected thereto, the provision of an accumulator results in an increase in time required from the time of actuation of the shift timing valve until a fluid pressure in the servo-chamber on a release side reaches a given pressure level to release an engaging member. Stated differently, there takes place an overlapped engagement of engaging members both on a high speed side and on a low speed side, thus causing a locking condition and wear of the engaging members.

(2) Even in a case where a diameter of an orifice is so designed as to nullify the overlapping time, a variation in coefficient of viscosity and a variation in diameter of the orifice due to manufacturing error may lead to underlapped or overlapped engagements of engaging members in an automatic transmission.

Thus, difficulty is encountered with the manufacture of automatic transmissions with regard to providing desired performances.

It is a primary object of the present invention to provide a hydraulic control system for use in an automatic transmission, which avoids the aforesaid two problems (1) and (2) and which allows a sharp drop of a fluid pressure in the servo-chamber to be released, the moment fluid pressure on another servo-chamber to cause engagement of another engaging member reaches a given pressure level.

SUMMARY OF THE INVENTION

Briefly, the present invention may be described as a hydraulic control system for use in an automatic transmission, which includes at least first and second engaging members, a transmission for establishing at least two change gear ratios due to the selective engagement of said first and second engaging members, a first servo-mechanism for controlling engagement of said first engaging member for high speed, and a second servo-mechanism for controlling engagement of said second engaging member for low speed. Shifting to high speed is established due to engagement of said first engaging member and release of said second engaging member, and shifting to low speed is established due to release of said first engaging member and engagement of said second engaging member. The invention is characterized by a shift timing valve for controlling the communication of the second servo-mechanism with an accumulator for use with the second servo-mechanism in response to the build-up of pressure to a given level in the first servo-mechanism.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

In order to provide a better understanding of the present invention, the operation of a prior art hydraulic control circuit upon upshifts will first be described.

Figure 1:
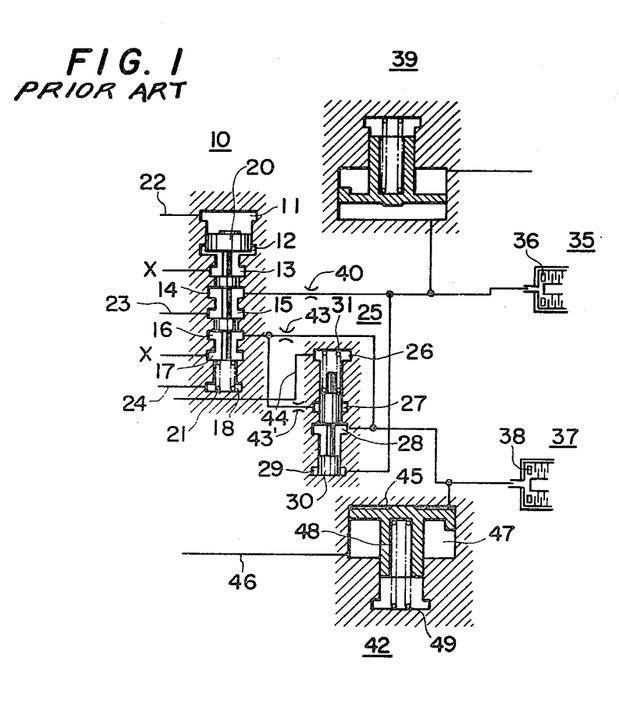
FIG. 1 is a schematic view of a prior art hydraulic control circuit.

Referring to FIG. 1, wherein such a prior art system is depicted, a shift valve 10 includes fluid chambers 11, 12, 13, 14, 15, 16, 17, 18, and a spool 20. The spool 20 includes several lands and undergoes a downward force by a fluid pressure fed into the fluid chamber 11, and an upward force by a fluid pressure fed into the fluid chamber 18 and by a spring 21. Supplied to the fluid chamber 11 through a fluid passage 22 is a governor pressure which is associated with the drive speed of a vehicle. A line pressure is supplied through a fluid passage 23 to the fluid chamber 15. Supplied to the fluid chamber 18 through a fluid passage 24 is a throttle pressure associated with a torque of an internal combustion engine. The fluid chamber 13 and 17 are connected to exhaust passages (drains) X. In an upper position of the spool 20 as shown, the fluid chamber 13 is communicated with the fluid chamber 14, and the fluid chamber 15 is communicated with the fluid chamber 16. On the other hand, in a lower position of the spool 20, the fluid chamber 14 is communicated with the fluid chamber 15, and the fluid chamber 16 is communicated with the fluid chamber 17.

A shift timing valve 25 includes fluid chambers 26, 27, 28, 29, and a spool 30. The spool 30 undergoes a downward force by a fluid pressure fed into the fluid chamber 26 and by a spring 31, and an upward force by a fluid pressure fed into the fluid chamber 29. In an upper position of the spool 30, the fluid chamber 27 is communicated with the fluid chamber 28. In a lower position of the spool 30, the fluid chamber 27 is shut off from communication with the fluid chamber 28.

For providing a change gear ratio for a high speed drive for a transission, a line pressure is supplied to a servo-chamber 36 in a hydraulic servo-mechanism 35, while a servo-chamber 38 in a hydraulic servo-mechamism 37 is connected to an exhaust passage. On the other hand, for providing a change gear ratio for a low speed drive for a transmission, the servo-chamber 36 is communicated with an exhaust passage, while a line pressure is supplied to the servo-chamber 38. The servo-chamber 36 in the hydraulic servo-mechanism 35 is connected to the fluid chamber 29 in the shift timing valve 25 and by way of an orifice 40 to the fluid chamber 14 in the shift valve 10. The servo-chamber 38 in the hydraulic servo-mechanism 37 is connected to an accumulator 42 as well as to the fluid chamber 28 in the shift timing valve 25 and by way of an orifice 43 to the fluid chamber 16 in the shift valve 10, respectively. The fluid chamber 27 in the shift timing valve 25 is connected by way of an orifice 43' to the fluid chamber 16 in the shift valve 10, while a throttle pressure is supplied by way of a fluid passage 44 to the fluid chamber 26. An accumulator 42 includes a fluid chamber 45 connected to the servo-chamber 38, a fluid chamber 47, to which a line pressure is supplied through the fluid passage 46, and a spool 48. The spool 48 undergoes a downward force by a fluid pressure fed into the fluid chamber 45, and an upward force by a line pressure fed into the fluid chamber 47 and by a spring 49, as viewed in the drawing.

Figure 2:
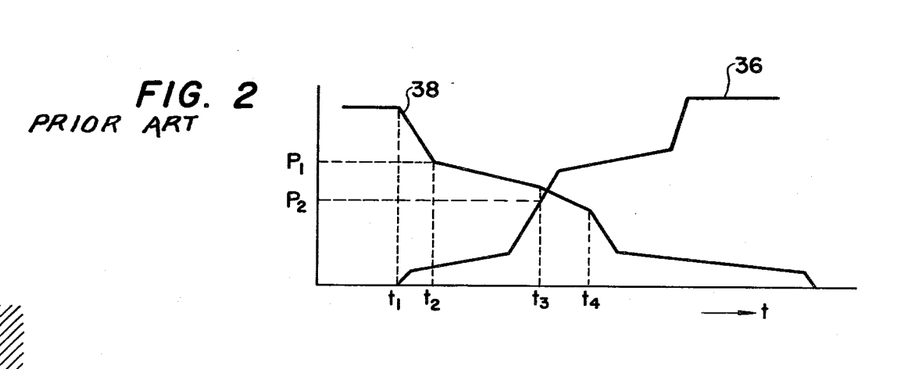
FIG. 2 is a plot showing the operation of the hydraulic control circuit of FIG. 1.

Pressure variations in the servo-chambers on upshifts in the prior art hydraulic control circuit are plotted in FIG. 2.

Prior to the time t1, i.e., before upshifts, a governor pressure is low, so that the spool 20 in the shift valve 10 remains in its upper position. Accordingly, a line pressure is supplied by way of fluid chamber 15, 16 to the servo-chamber 38 in the hydraulic servo-mechanism on a low speed side. On the other hand, a fluid pressure in the servo-chamber in the hydraulic servo-mechanism 35 on a high speed side is exhausted by way of the fluid chambers 14, 13 in the shift valve 10. The fluid chamber 29 in the shift timing valve 25 is communicated with the servo-chamber 26 on an exhaust side, so that the spool 30 remains in its lower position.

With an increase in vehicle drive speed, a governor pressure is increased. Thus, at the time t1, the spool 20 in the shift valve 10 is displaced to its lower position. At the time t1, the spool 30 in the shift timing valve 25 still remains in its lower position. As a result, a fluid pressure in the servo-chamber 36 is increased, while a fluid pressure in the servo-chamber 38 is exhausted only by way of the orifice 43, without passing through the shift timing valve 25.

When a fluid pressure in the servo-chamber 38 goes below a given pressure level P1 at the time t1 (the given pressure level P1 varies depending on a throttle pressure.), the spool 48 in the accumulator 42 begins shifting to its upper position, so the volume of the fluid chamber 45 is decreased. Accordingly, from the time t2 on, the gradient of a fluid pressure drop in the servo-chamber 38 is reduced.

When a fluid pressure in the servo-chamber 36 in the hydraulic servo-mechanism 35 on a high speed side reaches a given pressure level P2 at the time t3 (the pressure level P2 varies depending on a throttle valve) then the spool 30 is displaced to its upper position due to a fluid pressure in the fluid chamber 29 in the shift timing valve 25, which is communicated with the servo-chamber, against a throttle pressure fed into the fluid chamber 26 and a force of the spring 31. Thus, from the time t3 on, the fluid chamber 16 in the shift valve is communicated, by way of a passage including an orifice 43 and another passage including fluid chambers 27, 28 in the shift timing valve 25, with the accumulator 42 and servo-chamber 38. Since the flow rate of a fluid being exhausted from the servo-chamber 38 is increased, a gradient of a pressure drop in the servo-chamber 38 from the time t3 on is increased, as compared with that during a period between the time t2 and t3.

At the time t4, the spool 48 in the accumulator 42 begins moving to an upper position, and the volume of the fluid chamber 45 is increased. As a result a gradient of the pressure drop in the servo-chamber 38 from the time t2 on is decreased.

When a fluid pressure in the servo-chamber 36 in the hydraulic servo-mechanism 35 on the high speed side reaches a given pressure level P2 at the time t3 (the pressure level P2 varies depending on a throttle pressure) the spool 30 in the shift timing valve 25 is shifted to its upper position by fluid pressure fed into the fluid chamber 29 communicated with the servo-chamber 36 against a throttle pressure in the fluid chamber 26, as well as by a force of the spring 31. Thus, from the time t3 on, the fluid chamber 16 in the shift valve 10 is communicated with the accumulator 42 and servo-chamber 38 by way of two paths, i.e., through a fluid passage including the orifice 43 and another fluid passage including the fluid chambers 27, 28 in the shift timing valve 25. In other words, the flow rate of a fluid being exhausted from the servo-chamber 38 is increased, so that a gradient of a pressure drop in the servo-chamber 38 from the time t3 on is increased, as compared with that during a period between the time t2 and the time t3.

At the time t4, the spool 48 in the accumulator 48 has reached its upper position, so that only fluid pressure in the servo-chamber 38 is returned, with a resulting sharp pressure drop in the servo-chamber 38.

Upon upshifts, the hydraulic control circuit controls the shift timing valve due to fluid pressure from a servo-chamber on the high speed side, and then controls the communication of an exhaust passage with a servo-chamber on a release side, in response to fluid pressure from a servo-chamber on a high speed side.

In a system arranged in the manner described above, the problems previously mentioned are encountered.

First, there occurs an overlapped engagement of engaging members both on a high speed side and on a low speed side thereby causing a locking and wear of the engaging members. Even where an orifice is designed to attempt to nullify the overlapping operation, variations in viscosity and in the orifice dimensions could lead to underlapped or overlapped engagement of the engaging members of the automatic transmission.

The present invention is directed toward avoiding these problems.

Figure 3:
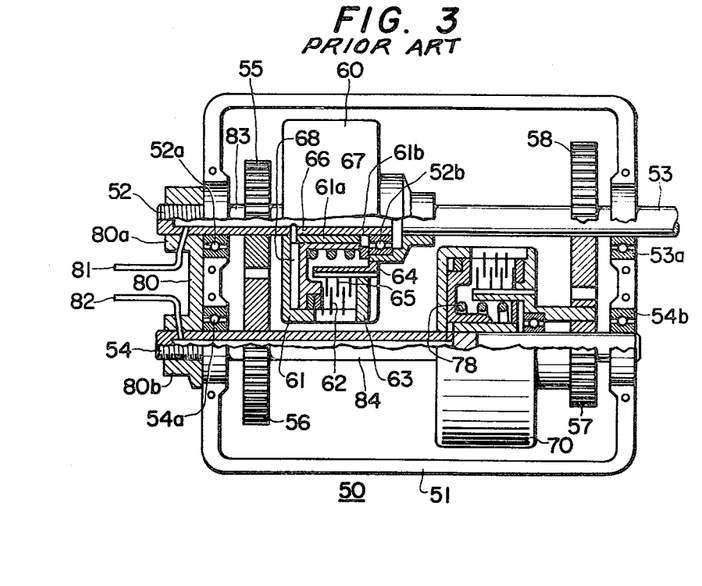
FIG. 3 is a front view of a transmission for use in the present invention.

FIG. 3 shows one example of a transmission, to which is applied a hydraulic control system according to the present invention, i.e., a two speed counter shaft type transmission. A transmission 50 includes a gear casing 51, input shafts 52, 53 coaxial with each other, an intermediate shaft 54 in parallel with the shafts 52, 53, gears 55, 56, 57, 58 and multiple clutches 60, 70 having hydraulic servo-mechanisms. The input shaft 52 is coupled in a bearing 52b in coaxial rotatable relationship to the input shaft 53 while the other ends of the shafts 52, 53 are supported in bearings 52a, 53a attached to the casing 51. The shaft 54 is supported at the opposite ends in bearings 54a, 54b attached to the casing 51.

Gears 55, 56, 57, 58 are rigidly supported on the shafts 52, 54, 53, respectively. However, the gear 57 is rotatably supported relative to the shaft 54. The clutch 60 interconnects the shafts 52 and 53, while the clutch 70 interconnects the shaft 54 and the gear 57.

The clutches 60 and 70 are of a known construction, and thus the clutch 60 alone will be described. The clutch 60 includes a drum 61, clutch plates 62 adapted to be coupled thereto, a clutch end plate 63, a hub 64, clutch plates 65 coupled to the hub 64 and disposed in alternate relation to the clutch plates 62, an annular piston 66 disposed between an inner periphery of the drum 61 and the outer periphery of a drum boss 61a, a spring 67, whose one end abuts a retaining seat 61a secured to the tip of the drum boss 61a and whose other end presses the piston 66, and a servo-chamber 68 defined by the drum 61 and the piston 66. The clutch 70 is of the same construction as that of the clutch 60, with a servo-chamber 78 thereof shown. For feeding and exhausting fluids to and from the servo-chambers 68, 78, there are provided fluid pipes 81, 82 attached to bosses 80a, 80b on a seal plate 80, and axial fluid passages 83, 84 extending through the shafts 52, 54, respectively.

With the aforesaid arrangement of the clutches, when a fluid pressure is exhausted from the servo-chamber 68, and a fluid pressure is applied to the servo-chamber 78, then the input shaft 52 is coupled by the medium of gears 55 to 58 to the output shaft 53, thereby providing a change gear ratio for a low speed drive. Conversely, when a fluid pressure is supplied to the servo-chamber 68, and a fluid pressure is exhausted from the servo-chamber 78, then the input shaft 52 is directly coupled to the output shaft 53, thereby providing a change gear ratio for a high speed drive. Shifting from a low speed drive to a high speed drive is referred to as upshifts, while the shifting from the high to the low is referred to as downshifts.

Figure 4:
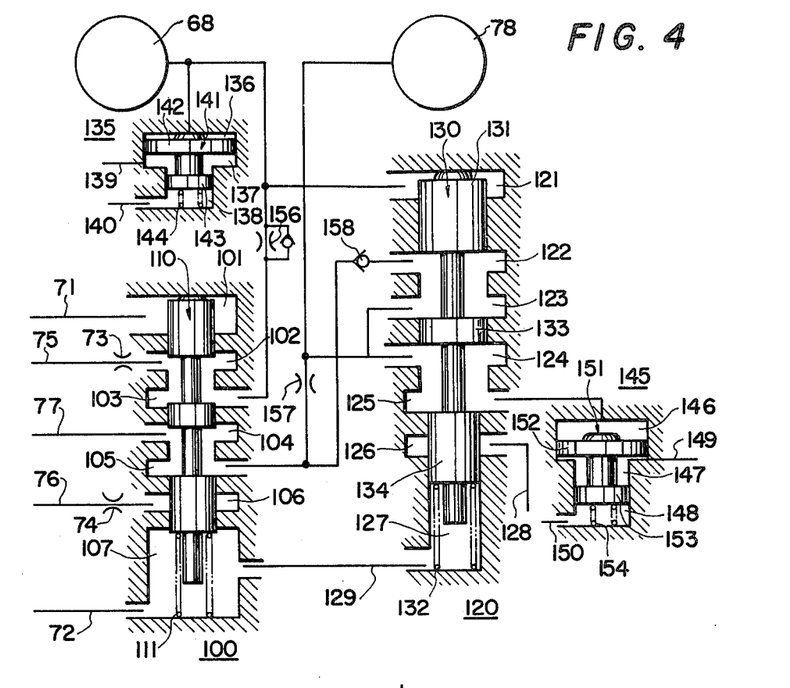
FIG. 4 is a schematic view of a hydraulic control circuit embodying the present invention.

Referring to FIG. 4, there is shown a shift valve at 100. The shift valve 100 includes fluid chambers 101, 102, 103, 104, 105, 106, 107, and a spool 110. Supplied to the fluid chamber 101 by way of a fluid passage 71 is a governor pressure whose level is proportional to a vehicle speed, and which is fed from a governor valve such as disclosed in the Japanese Patent Publication Sho 48-020655 or U.S. Pat. No. 3,707,890. Supplied to the fluid chamber 107 by way of a fluid passage 72 is a throttle pressure whose level is proportional to an output torque of an internal combustion engine and which is fed from a throttle valve such as disclosed in the Japanese Patent Publication Sho 48-20655 or U.S. Pat. No. 3,707,890. The fluid chambers 102, 106 are communicated with exhaust passages (drains) 75, 76 having orifices 73, 74, respectively. Supplied to the fluid chamber 104 by way of a fluid passage 77 is a line pressure from a pressure regulator valve as disclosed in the Japanese Patent Publication Sho 48-20655 or U.S. Pat. No. 3,707,890. The spool 110 undergoes a downward force by a governor pressure fed into the fluid chamber 101, as viewed in the drawing, and an upward force by a throttle pressure fed into the fluid chamber 107 and by a force of a spring 111.

(1) In an upper position of the spool 110:

The fluid chamber 103 is communicated with the fluid chamber 102, while a pressure is exhausted from the fluid chamber 103.

The fluid chamber 105 is communicated with the fluid chamber 104, while a line pressure is supplied to the fluid chamber 105.

(2) In a lower position of the spool 110:

The fluid chamber 103 is communicated with the fluid chamber 104, while a line pressure is supplied thereto.

The fluid chamber 105 is communicated with the fluid chamber 106 (on a drain side), and a fluid pressure is exhausted from the fluid chamber 105.

A shift timing valve 120 includes fluid chambers 121, 122, 123, 124, 125, 126, 127 and a spool 130. A fluid pressure in the fluid chamber 121 is applied to a land 131 of the spool 130, thereby exerting a downward force to the spool 130. A fluid pressure in the fluid chamber 127 is applied to a land 134 of the spool 130 and exerts an upward force to the spool 130 in cooperation with a spring 132. The fluid chamber 126 is communicated with an exhaust passage 128, while a line pressure is applied by way of a fluid passage 129 to the fluid chamber 127. In this embodiment, a cross sectional area of the land 131 is the same as that of the land 133, while a cross sectional area of the land 134 is smaller than that of the lands 131, 133. Due to a difference in cross sectional area between the land 133 and the land 134, a fluid pressure in the fluid chamber 124 exerts an upward force to the spool 130 by a fluid pressure in the fluid chamber 124, only when the spool 130 is being moved to its lower position. Accordingly, a fluid pressure in the fluid chamber 121, when the spool 130 is being moved to its lower position, is higher than a fluid pressure in the fluid chamber 121, when the spool 130 is being moved to its upper position.

An accumulator 135 for the servo-chamber 68 on a high speed side includes fluid chambers 136, 137, 138. A line pressure is supplied by way of a fluid passage 139 to a fluid chamber 137, while a fluid chamber 138 is connected to an exhaust passage 140 for drain. A spool 141 in the accumulator 135 includes a land 142 and a land 143 having a cross sectional area smaller than that of the land 142. Due to a difference in cross sectional area between the land 142 and the land 143, a line pressure in the fluid chamber 137 exerts an upward force to the spool 141 in cooperation with a spring 144. A fluid pressure in the fluid chamber 136 exerts a downward force to the spool 141.

An accumulator 145 for the servo-chamber 78 is of the same arrangement as that of the accumulator 135. The accumulator 145 includes fluid chambers 146, 147, 148. A line pressure is supplied by way of a fluid passage 149 to the fluid chamber 147, while the fluid chamber 148 is connected to an exhaust passage 150 for drain. A spool 151 in the accumulator 145 includes a land 152 and a land 153 having a cross sectional area smaller than that of the land 152. Due to a difference in cross sectional area between the land 152 and the land 153, a line pressure in the fluid chamber 147 exerts an upward force to the spool 151 in cooperation with a spring 154, while a fluid pressure in the fluid chamber 146 exerts a downward force to the spool 151.

The servo-chamber 68 is connected to the fluid chamber 136 in the accumulator 135 as well as to the fluid chamber 121 in the shift timing valve 120. The servo-chamber 68 is further connected by way of an orifice 156 to the fluid chamber 103 in the shift valve 100. The servo-chamber 78 is connected to the fluid chambers 123, 124 in the shift timing valve 120 as well as to the fluid chamber 105 in the shift valve 100 by way of an orifice 157. The fluid chamber 105 is connected by way of a check valve 158 allowing only the flow of fluid to the fluid chamber 122 in the shift timing valve 120. The fluid chamber 125 in the shift timing valve 120 is connected to the fluid chamber 146 in the accumulator 145.

Figure 5:
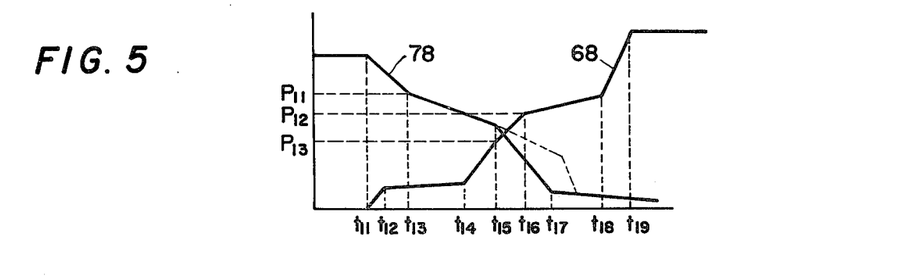
FIG. 5 is a plot showing the operation of the hydraulic control circuit of FIG. 4, upon upshifts.
Figure 6:
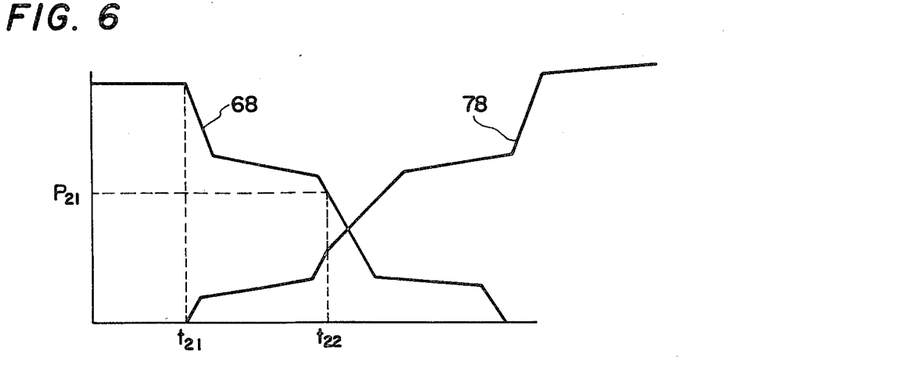
FIG. 6 is a plot showing the operation of the hydraulic control circuit of FIG. 4, upon downshifts.

The description will now be directed to the operation of the embodiment of the present invention with reference to FIGS. 5 and 6. FIG. 5 is a plot showing a variation in fluid pressures in servo-chambers, upon upshifts.

Prior to the time t11, i.e., when the vehicle speed is low, a governor pressure being supplied to the fluid chamber 101 in the shaft valve 100 is low, so the spool 110 remains in its upper position. As a result, fluid pressure in the servo-chamber 68 is exhausted by way of fluid chambers 103, 102. On the other hand, a line pressure is supplied by way of fluid chambers 104, 105 to the servo chamber 78. The fluid pressure in the fluid chamber 121 in in the shift timing valve 120 remains at the same level as that of a fluid pressure in the servo-chamber 68, which is being exhausted, so that the spool as well remains in its upper position. Accordingly, a line pressure is supplied by way of the fluid chambers 124, 125 to the fluid chamber 146 in the accumulator 145, the aforesaid line pressure being the same as that applied to the servo-chamber 78.

With an increase in vehicle speed, a governor pressure in the fluid chamber 101 is increased, and at the time t11, a downward force acting on the spool due to a governor pressure in the fluid chamber 101 overcomes an upward force acting on the spool 110 due to a throttle pressure in the fluid chamber 107 in cooperation with a force of the spring 111, with the result that the spool 110 is moved to its lower position. As a result, a line pressure is supplied by way of fluid chambers 104, 103 to the servo-chamber 68, while a fluid pressure in the servo-chamber 78 is exhausted therefrom by way of the fluid chambers 105, 106.

At the time t12, an increase in fluid pressure in the servo-chamber 68 causes an increase in volume of the servo-chamber 68. Accordingly, a gradient of a fluid pressure rise in the servo-chamber 68 is decreased, from the time t12 on.

At the time t13, when a fluid pressure in the servo-chamber 78 on a release side reaches a given pressure level P11, then spool 151 in the accumulator 145 begins moving to its upper position due to a line pressure fed in the fluid chamber 147 and a force of the spring 154, so a volume of the fluid chamber 146 is decreased. Thus, a gradient of a fluid pressure drop in the servo-chamber 78 is decreased, from the time t13 on.

At the time t14, an increase in volume in the servo-chamber 68 on an engaging side is ceased, so that a gradient of a pressure rise in the servo-chamber 68 is increased, from the time t14 on.

At the time t15, when a fluid pressure in the servo-chamber 68 on an engaging side reaches a given pressure level P13 (the pressure level P13 varies depending on a throttle pressure) a downward force acting on the spool 130 in the shift timing valve 120 due to a fluid pressure in the fluid chamber 121 overcomes an upward force acting on the spool 130 due to a throttle pressure in the fluid chamber 127 and due to a return force of the spring 132, so that the spool 130 assumes its lower position. As a result, the fluid chamber 124 is communicated with the fluid chamber 123, while the fluid chamber 125 is communicated with the fluid chamber 126 on a drain side. Stated differently, the servo-chamber 78 is shut off from communication with the fluid chamber 146 in the accumulator 145, and only a fluid pressure in the servo-chamber 78 is exhausted via orifice 157 and fluid chambers 105, 106. As a result, from the time t15 on, a gradient of a fluid pressure drop in the servo-chamber 78 is increased.

At the time t16, when fluid pressure in the servo-chamber 78 on an engaging side reaches a given pressure level t12, then the spool 141 in the accumulator 135 is moved to a lower position, so that the volume of the fluid chamber 136 is increased. As a result, a gradient of a fluid pressure rise in the servo-chamber 68 is increased, from the time t16 on.

At the time t17, the volume of the servo-chamber 78 begins decreasing. As a result, a gradient of a fluid pressure drop in the servo-chamber 78 is decreased.

At the time t18, the spool 141 in the accumulator 135 reaches its lower position. As a result, a gradient of a fluid pressure rise in the servo-chamber 68 is increased, from the time t18 on.

At the time t19, a fluid pressure in the servo-chamber 68 reaches a line pressure.

Shown by a broken line in FIG. 5 is a pressure drop in the servo-chamber on a release side in a prior art hydraulic control circuit (for instance, as shown in FIG. 1). According to the prior art hydraulic control circuit, even after the time t15 when the shift timing valve is changed over, fluid pressure in the accumulator is exhausted through the same fluid passage as that for a servo-chamber, thereby resulting in an increase in the time required for a drop in fluid pressure.

Operation upon downshifts will be described in conjunction with a graph shown in FIG. 6.

With a decrease in vehicle speed, a governor pressure in the fluid chamber 101 in the shift valve 100 is decreased. At the time t21, an upward force acting on the spool 110 overcomes a downward force acting thereon, so that the spool 110 assumes its upper position. Thus, fluid pressure in the servo-chamber 68 is exhausted by way of fluid chambers 103, 102. Meanwhile, a line pressure is supplied by way of fluid chambers 104, 105 to the servo-chamber 78. At this time, the spool 130 in the shift timing valve 120 remains in its lower position, so that the fluid chamber 122 becomes shut off from communication with the fluid chamber 123. As a result, fluid pressure is supplied to the servo-chamber 78 only through a fluid passage including an orifice 157.

At the time t22, fluid pressure in the servo-chamber 68 reaches a given pressure level P21, so that the spool 130 in the shift timing valve 120 is moved to its upper position against a fluid pressure in the fluid chamber 121. Thus, the fluid chamber 146 in the accumulator 145 is communicated with the servo-chamber 78, while a line pressure being supplied through a fluid passage 157 to the servo-chamber 78 passes through another fluid passage including a check valve 158, and fluid chambers 122, 123.

Meanwhile, in this embodiment, the cross sectional area of the land 134 is smaller than that of the land 133 so as to provide a hysterisis characteristic for the shift timing valve 120. Alternatively, the cross sectional area of the land 134 may be the same as that of the land 133. In addition, it is possible that throttle pressure is not fed to the fluid chamber 127, but an exhaust passage is connected to the fluid chamber 127.

Figure 7:
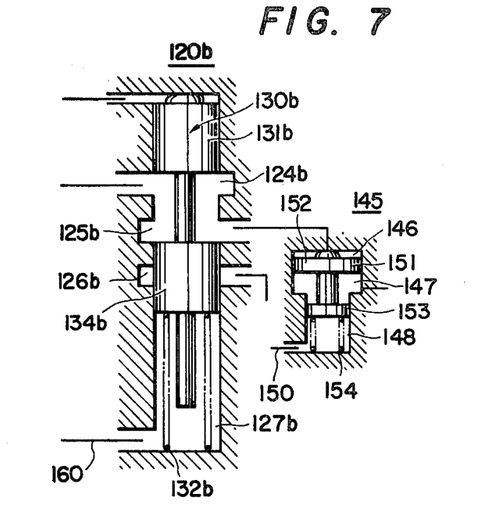
FIGS. 7 to 13 are schematic views of other hydraulic control circuits embodying the present invention.

FIG. 7 shows another embodiment of the present invention, in which like parts are designated with like reference numerals having a suffix 'b', in common with those in FIG. 4. A fluid chamber 127b is connected to an exhaust passage 160. Because of an absence of fluid chambers therein which correspond to the fluid chambers 122, 123 in the shift timing valve in FIG. 4, even after the spool in the shift timing valve has been moved to its upper position upon downshifts, the cross sectional area of the fluid passage for the line pressure to be supplied to the servo-chamber 78 is not increased. Thus, the time required for increasing fluid pressure in the servo-chamber 78 is increased, although the arrangement of the shift timing valve may be simplified.

Meanwhile, a spool 130b includes a first land 131b and a second land 134b, both of which have the same diameter. Thus, the land 131b controls the communication between a fluid chamber 124b and a fluid chamber 125b, while the land 134b controls the communication between a fluid chamber 125b and a fluid chamber 126b.

Figure 8:
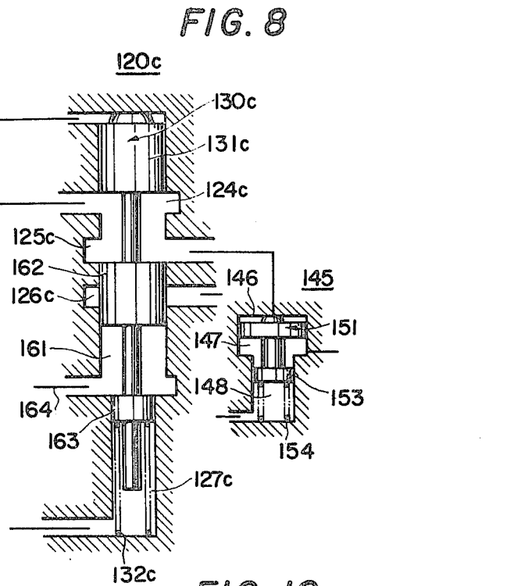

FIG. 8 is a modification of the embodiment of FIG. 7, in which like parts are designated with like reference numerals having a suffix 'c' in common with FIG. 4. A throttle pressure is supplied by way of a fluid passage 164 to the fluid chamber 161, and is defined by a land 162 and another land 163 having a cross sectional area smaller than the land 162. Due to a difference in cross sectional area between the land 162 and the land 163, throttle pressure fed into the fluid chamber 161 imparts an upward force to a spool 130c in cooperation with a spring 132c.

Meanwhile, a spool 130c includes a first land 131c, a second land 162, and a third land 163, the diameters of the first and second lands being the same and the diameter of the third land being smaller than that of the first and second. The first land controls the communication between a fluid chamber 124c and a fluid chamber 125c, and the second land 162 controls the communication between the fluid chamber 125c and the fluid chamber 126c.

Figures 9, 10:
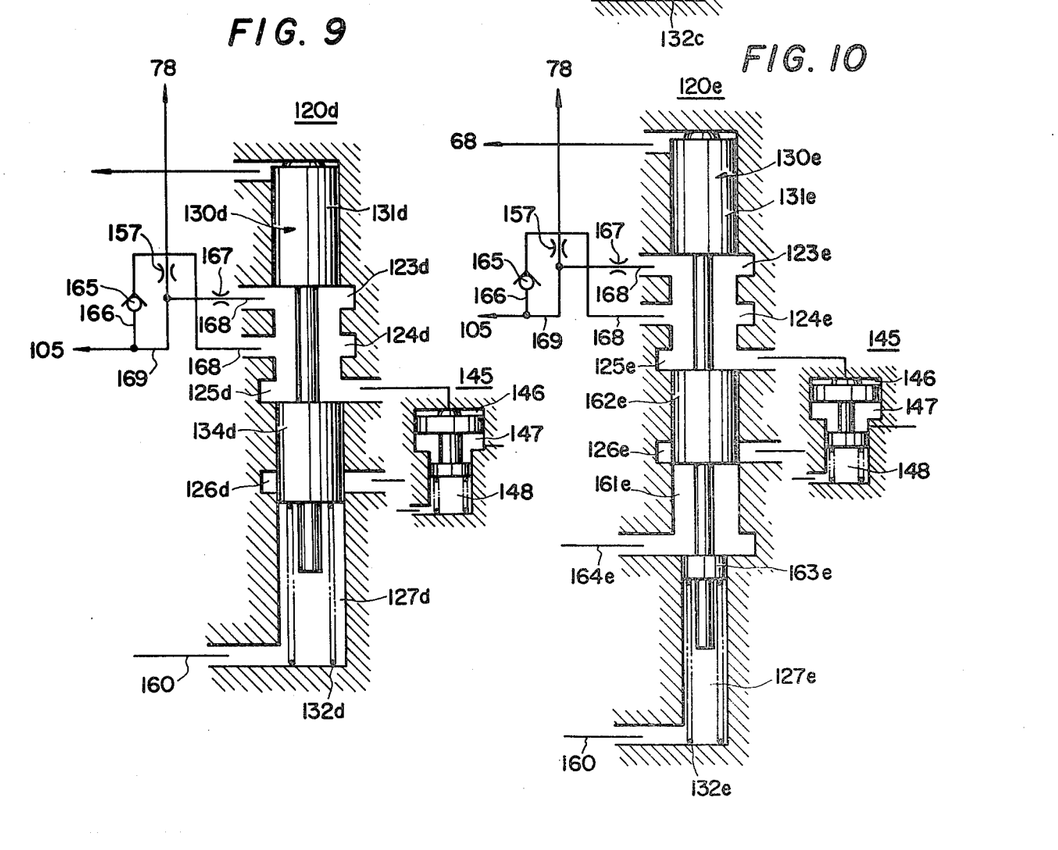

FIG. 9 shows a further embodiment of a shift timing valve and fluid passages according to the present invention, in which like parts are designated with like reference numerals having suffix 'd'. There are provided a fluid passage 169 having an orifice 157 and interconnecting the servo-chamber 78 and the fluid chamber 105 in the shift valve 100, another passage 166 having a check valve allowing only the flow of a fluid from the servo-chamber 78 to the fluid chamber 105 and running in parallel with the fluid 169, and still another passage having an orifice 167 and communicated with fluid chambers 123d, 124d. Upon upshifts fluid pressure in the servo-chamber 78 is exhausted through a fluid passage having an orifice 157 and passage 166 having the check valve 165, so that the time required for exhausting fluid pressure from the servo-chamber 78 is shortened. On the other hand, upon upshifts, even when the spool 130d in the shift timing valve 120d is moved to its upper position so as to bring the fluid chamber 146 in the accumulator 145 into communication with the servo-chamber 78, the fluid passage 168 is opened simultaneously therewith, with the result that a cross sectional area of fluid passages for supplying a line pressure to the servo-chamber 78 is increased, thereby shortening the time required for build-up of fluid pressure in the servo-chamber 78.

Meanwhile, a spool 130d includes a first land 131d, and a second land 134d, the diameters of the first and second lands being the same. The first land controls the communication between a fluid chamber 123d and a fluid chamber 124d and the communication between the fluid chamber 124d and a fluid chamber 125d. The third land controls the communication between a fluid chamber 125d and the fluid chamber 126d.

FIG. 10 is a modification of the embodiment of FIG. 9, in which like parts are designated with like reference numerals having a suffix 'e'. Like the embodiment shown in FIG. 8, there is provided a fluid chamber 161e, to which is fed a throttle pressure utilized as an upward force for a spool 130e.

Meanwhile, a spool 130e includes a first land 131e, second land 162e, and third land 163e. The first and second lands have the same diameter, the third land being a diameter smaller than that of the first and second. The first land controls the communication between a fluid chamber 123e and a fluid chamber 124e and the communication between the fluid chamber 124e and a fluid chamber 125e. The second land 162e controls the communication between the fluid chamber 125e and a fluid chamber 126e.

Figures 11, 12, 13:
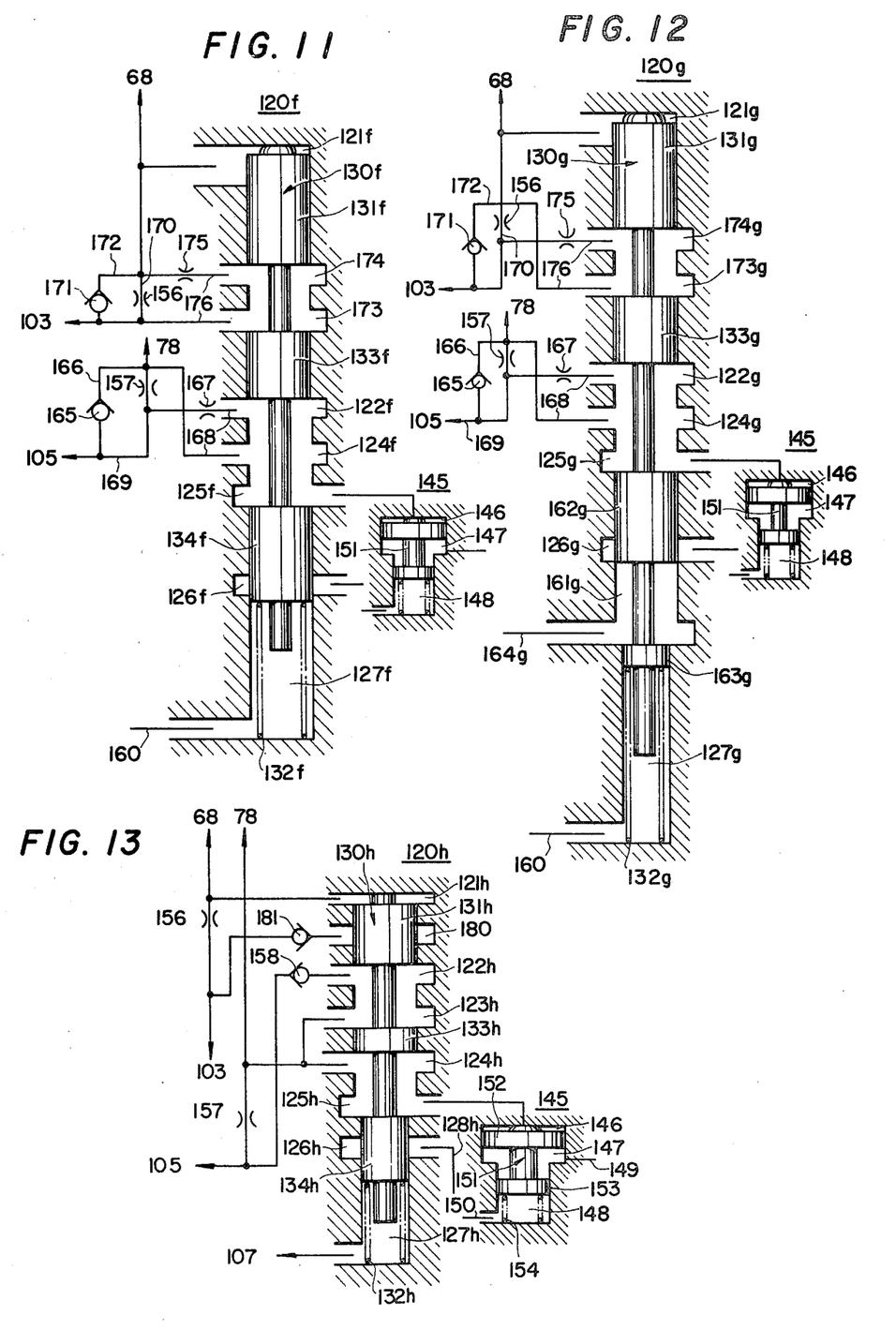

FIG. 11 is a still further embodiment of the present invention, in which like parts are designated with like reference numerals having a suffix 'f'. Running between the fluid chamber 103 in the shift valve 100 and the servo-chamber 68 is a fluid passage 170 having an orifice 156, another passage 172 having a check valve 171 allowing only the flow of a fluid from the servo-chamber 68 in parallel with the fluid passage 170, and a fluid passage having an orifice 175 and communicated with fluid chambers 173 and 174. Running between the fluid chamber 105 in the shift valve 100 and the servo-chamber 78 are fluid passages such as in the embodiment of FIG. 9. Upon upshifts, when a spool 130f in a shift timing valve 120f still remains in its upper position, a line pressure is supplied by way of a fluid passages 170 and 176 to the servo-chamber 68, so that the time required for a pressure rise in the servo-chamber 68 may be shortened. Upon downshifts, a fluid pressure in the servo-chamber 68 is exhausted through the fluid passage 172 having the check valve 171, so that the time required for pressure drop in the servo-chamber 68 may be shortened.

Meanwhile, a spool 130f includes a first land 131f, second land 133f, and third land 134f, the diameter of the first, second and third lands being the same. The first land 131f controls the communication between a fluid chamber 174 and a fluid chamber 173. The second land 133f controls the communication between a fluid chamber 122f and a fluid chamber 124f, and the communication between the fluid chamber 124f and a fluid chamber 125f. The third land 134f controls the communication between a fluid chamber 125f and a fluid chamber 126f.

FIG. 12 shows a modification of FIG. 11, which is similar to the shift timing valve of FIG. 8 in that a throttle pressure is utilized as an upward force acting on a spool 130g.

Meanwhile, a spool 130g includes a first land 131g, second land 133g, third land 162g, and a fourth land 163g. The diameters of the first, second, third lands are the same, while the diameter of the fourth land 163g is smaller than that of the first, second and third. The first land 131g controls the communication between a fluid chamber 174g and a fluid chamber 173g. The second land 133g controls the communication between a fluid chamber 122g and a fluid chamber 124g, and the communication between the fluid chamber 124g and a fluid chamber 125g. The third land controls the communication between a fluid chamber 125g and a fluid chamber 126g.

FIG. 13 shows a further embodiment of the present invention, in which like parts are designated with like reference numerals having a suffix 'h', in common with those shown in FIG. 4. A fluid chamber 180 is provided in a shift timing valve 120h. Provided between a fluid chamber 105 in the shift valve 100 and the fluid chamber 180 is a check valve 181 allowing only the flow of a fluid from the fluid chamber 180 to the fluid chamber 105. Accordingly, upon downshifts, when a spool 130h in a shift timing valve 120h still remains in its lower position, a fluid pressure in the servo-chamber 68 is exhausted by way of fluid chambers 121h, 180 and check valve 181, so that the time required for a pressure drop in the servo-chamber 68 is shortened.

Meanwhile, a spool 130h includes a first land 131h, a second land 133h, and a third land 134h whose diameter is smaller than the diameter of the first and second lands which have the same diameter.

The first land 131h controls the communication between a fluid chamber 180 and a fluid chamber 122h and the communication between a fluid chamber 122h and a fluid chamber 123h. The second land controls the communication between a fluid chamber 123h and a fluid chamber 124h, and the communication between the fluid chamber 124h and a fluid chamber 125h. The third land 134h controls the communication between the fluid chamber 125h and a fluid chamber 126h.

As is apparent from the foregoing description of the hydraulic control system according to the present invention, upon upshifts, when a fluid pressure in a servo-chamber on an engaging side reaches a given pressure level, an accumulator for a servo-chamber on a release side is shut off from communication with the servo-chamber, so that the time required from the actuation of the shift timing valve until a pressure drop in the servo-chamber on a release side may be shortened. As a result, there may be prevented a locking condition of engaging members due to overlapped engagements thereof or wear of the engaging members. In addition, upon upshifts, when the shift timing valve is actuated, a fluid passage for a servo-chamber on a release side, which has no orifice, is opened, so that there may be prevented overlapped or underlapped engagement of engaging members, due to manufacturing errors.

While the description provided has been related to a two speed transmission, the present invention may be applied to a transmission having three or more speeds in a like manner, i.e., to each pair of a servo-chamber on a high speed side and another servo-chamber on a low speed side, which are adjoining to each other.

While specific embodiments of the invention have been shown and described in detail to illustrate the application of the inventive principles, it will be understood that the invention may be embodied otherwise without departing from such principles

What is claimed is:

1. In an hydraulic control system for an automatic transmission including: at least first and second engaging members; a transmission for establishing at least two change gear ratios due to selective engagement of said first and second engaging members; a first servo-mechanism for controlling the engagement of said first engaging member for shifting to a high speed; and a second servo-mechanism for controlling the engagement of said second engaging member for shifting to a low speed; said shifting to a high speed being established due to engagement of said first engaging member and release of said second engaging member, and said shifting to a low speed being established due to release of said first engaging member and engagement of said second engaging member; the improvement comprising accumulator means operatively associated with said second servo-mechanism, and a shift timing valve mounted between said accumulator means and said second servo-mechanism for controlling communication of said second servo-mechanism with said accomulator means in response to build-up of pressure to a given level in said first servo-mechanism, wherein said system comprises:

(a) a transmission including first and second servo-chambers;

(b) a shift valve including first, second, third, fourth, fifth, sixth, seventh fluid chambers and a spool, said first fluid chamber being supplied a governor pressure, said seventh fluid chamber being supplied a throttle pressure, said second and sixth fluid chambers being connected to exhaust passages, respectively, said fourth fluid chamber being supplied a line pressure from a pressure regulator, said system operating such that in the upper position of said spool, said third fluid chamber is communicated with said second fluid chamber, a fluid pressure in said third fluid chamber is exhausted, said fifth fluid chamber is communicated with said fourth fluid chamber, and said fifth fluid chamber is supplied a line pressure, and such that in a lower position of said spool, said third fluid chamber is communicated with said fourth fluid chamber, and supplied a line pressure, said fifth fluid chamber is communicated with said sixth fluid chamber, and a fluid pressure in said fifth fluid chamber is exhausted, said spool having first, second and third lands having the same diameter, said first land controlling the communication between said second and third fluid chambers, said second land controlling the communication between said third and fourth fluid chambers and the communication between said fourth and fifth fluid chambers, said third land controlling the communication between said fifth fluid chamber and said sixth fluid chamber;

(c) a shift timing valve including first, second, third, fourth, fifth, sixth, seventh fluid chambers and a spool, fluid pressure in said first fluid chamber exerting a downward force to said spool, fluid pressure in said seventh fluid chamber exerting an upward force to said spool, said sixth fluid chamber being connected to an exhaust passage, said seventh fluid chamber being supplied a throttle pressure, said spool having first and second and third lands, the diameters of said first land and said second land being the same, the diameter of said third land being smaller than that of said first and second lands, said first land controlling the communication between said second and third fluid chambers, said second land controlling the communication between the third and fourth fluid chambers and the communication between the fourth and fifth fluid chambers and said third land controlling the communication between said fifth and sixth fluid chambers;

and wherein said accumulator means comprise:

(d) a first accumulator for use with said first servo-chamber, said first accumulator including first, second, third fluid chambers and a spool, said second fluid chamber being supplied a line pressure exerting an upward force to said spool and a fluid pressure in said first fluid chamber exerting a downward force to said spool; and (e) a second accumulator for use with said second servo-chamber, said second accumulator including first, second, third fluid chambers and a spool, said second fluid chamber being supplied a line pressure, said third fluid chamber being connected to an exhaust passage, fluid pressure in said second fluid chamber exerting an upward force to said spool, and fluid pressure in said first fluid chamber exerting a downward force to said spool;

said first servo-chamber being connected to (i) said first fluid chamber in said first accumulator, (ii) said first fluid chamber in said shift timing valve, and (iii) said third fluid chamber in said shift valve by way of an orifice, said second servo-chamber being connected to (i) said third and fourth fluid chambers in said shift timing valve, and (ii) said fifth fluid chamber in said shift valve by way of an orifice, said fifth fluid chamber in said shift valve being connected to said second fluid chamber in said shift timing valve by way of a check valve which allows only a flow of fluid to said second fluid chamber in said shift timing valve, and said fifth fluid chamber in said shift timing valve being connected to said first fluid chamber in said second accumulator.

2. The improvement according to claim 1, wherein said second and third fluid chambers and second land in said shift timing valve are eliminated, and said seventh fluid chamber is connected to an exhaust passage. (FIG. 7).

3. The improvement according to claim 2, wherein said spool has first, second, third lands, the diameters of said first and second lands being the same, and the diameter of said third land being smaller than that of said first and second lands, with a chamber being defined between said second and third lands, whereby a throttle pressure in said chamber exerts an upward force to said spool.

4. The improvement according to claim 1, wherein there are provided a first passage and a second passage communicating said second servo-chamber with said fifth fluid chamber in said shift valve, said first passage including an orifice, said second fluid passage including a check valve in parallel with said first passage, said second fluid chamber in said shift timing valve being connected by way of an orifice to a portion of said first passage downstream of said orifice, and wherein said shift timing valve includes first, second, third, fourth, fifth, sixth fluid chambers and a spool having first and second lands, said first fluid chamber being connected to said first servo-chamber, said second fluid chamber being connected to said first passage downstream of said orifice in said first fluid passage, said third fluid chamber being connected to said first passage upstream of said orifice, said fourth fluid chamber being connected to said accumulator, said fifth fluid chamber being connected to an exhaust passage, said sixth fluid chamber being connected to said seventh fluid chamber in said shift valve, said first land controlling the communication between said second and third fluid chambers, and the communication between said fourth and fifth fluid chambers, and said second land controlling the communication between said fifth and sixth fluid chambers. (FIG. 9)

5. The improvement according to claim 4, wherein said spool has a third land in addition to said first and second lands, the diameter of said third land being smaller than that of the first and second lands, a fluid chamber being defined between said second and third lands and supplied a throttle pressure which acts on said spool so as to move said spool upwardly. (FIG. 10)

6. The improvement according to claim 1, wherein there are provided: a first fluid passage and a second fluid passage communicating said first servo-chamber with said third fluid chamber in said shift valve, said first passage including a first orifice, said second fluid passage including a check valve and running in parallel with said first fluid passage; and a third fluid passage and fourth fluid passage communicating said second servo-chamber with said fifth fluid chamber in said shift valve, said third fluid passage including a third orifice and said fourth fluid passage including a check valve and running in parallel with said third fluid passage; and wherein said shift timing valve includes first, second, third, fourth, fifth, sixth, seventh, eighth fluid chambers and a spool having first, second and third lands, said first fluid chamber being connected to said first fluid passage upstream of said orifice, said second fluid chamber being connected to said first fluid passage through a second orifice, said third fluid chamber being connected to said first fluid passage downstream of said first orifice, said fourth fluid chamber being connected through a fourth orifice to said third fluid passage downstream of said third orifice, said fifth fluid chamber being connected to said third fluid passage upstream of said third orifice, said sixth fluid chamber being connected to said second accumulator, said seventh fluid chamber being connected to an exhaust passage, said eighth fluid chamber being connected to said seventh fluid chamber in said shift valve, said first land controlling the communication between said second and third fluid chambers, said second land controlling the communication between said third and fourth fluid chambers and the communication between said fourth and fifth fluid chambers, and said third land controlling the communication between said sixth and seventh fluid chambers. (FIG. 11)

7. The improvement according to claim 6, wherein said spool has a fourth land in addition to said first, second and third lands, said fourth land having a diameter smaller than that of said first to third lands, with another fluid chamber being defined by said third land and fourth land therebetween, said another fluid chamber being supplied a throttle pressure so as to move said spool upwardly. (FIG. 12)

8. The improvement according to claim 1, wherein there are provided a first fluid passage and a second fluid passage, said first fluid passage communicating said first servo-chamber with said third fluid chamber in said shift valve, and including a first orifice, said second fluid passage communicating said second servo-chamber with said fifth fluid chamber in said shift valve, and including a second orifice, and wherein said shift timing valve includes first, second, third, fourth, fifth, sixth, seventh, and eighth fluid chambers, and a spool having first, second and third lands, said first fluid chamber being connected to said first fluid passage upstream of said first orifice, said second fluid chamber being connected through a first check valve to said first fluid passage downstream of said first orifice, said third fluid chamber being connected through a second check valve to said second fluid passage downstream of said second orifice, said fourth and fifth fluid chambers being connected to said second fluid passage upstream of said second orifice, said sixth fluid chamber being connected to said second accumulator, said seventh fluid chamber being connected to an exhaust passage, said eighth fluid chamber being connected to said seventh fluid chamber in said shift valve, said third land having a diameter smaller than that of said first and second lands, said first land controlling the communication between said second and third fluid chambers and the communication between said third and fourth fluid chambers, said second land controlling the communication between said fourth and fifth fluid chambers and the communication between said fifth and sixth fluid chambers, and said third land controlling the communication between said sixth and seventh fluid chambers. (FIG. 13)

* * * * *